(12) United States Patent
Taya et al.

(10) Patent No.: US 10,527,189 B2
(45) Date of Patent: Jan. 7, 2020

(54) VALVE ACTUATOR FOR AN ELECTRICALLY ACTUATED POPPET VALVE INCLUDING A CONTINUOUSLY VARIABLE TRANSMISSION AND A POWER FREE LATCHING MECHANISM

(71) Applicant: IHI Corporation, Koto-ku (JP)

(72) Inventors: Kohei Taya, Tokyo (JP); Hatsuo Mori, Tokyo (JP); Kenji Hirai, Tokyo (JP); Yu Hirata, Gunma (JP); Masahiro Tanaka, Tokyo (JP); Takeshi Takaki, Hiroshima (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/966,573

(22) Filed: Apr. 30, 2018

(65) Prior Publication Data

US 2018/0245710 A1   Aug. 30, 2018

Related U.S. Application Data

(63) Continuation of application No. PCT/JP2016/082810, filed on Nov. 4, 2016.

(30) Foreign Application Priority Data

Nov. 13, 2015  (JP) .................................. 2015-223058

(51) Int. Cl.
   *F16K 31/44*   (2006.01)
   *F16K 31/04*   (2006.01)
   (Continued)

(52) U.S. Cl.
   CPC .......... *F16K 31/44* (2013.01); *F04B 39/1013* (2013.01); *F16K 1/00* (2013.01);
   (Continued)

(58) Field of Classification Search
   CPC .......... F16K 31/44; F16K 1/20; F16K 31/047; F16K 31/16; F16K 1/00; F04B 39/1013
   (Continued)

(56) References Cited

U.S. PATENT DOCUMENTS 3,095,901 A * 7/1963 Larson .................. F16K 17/042
                                                137/514.5
3,156,161 A * 11/1964 Forsman ................. F15B 15/06
                                                251/58

(Continued)

FOREIGN PATENT DOCUMENTS

BY         5146 C1      6/2003
DE     1 283 168 B     11/1968
(Continued)

OTHER PUBLICATIONS

International Search Report dated Jan. 24, 2017 in PCT/JP2016/082810 filed Nov. 4, 2016 (with English Translation).
(Continued)

*Primary Examiner* — John Bastianelli
(74) *Attorney, Agent, or Firm* — Oblon, McClelland, Maier & Neustadt, L.L.P.

(57) ABSTRACT

A valve actuator is a valve actuator that drives opening and closing of a poppet valve and includes a motor and a transmission mechanism that transmits a drive force of the motor to the poppet valve. The transmission mechanism includes a booster mechanism. The booster mechanism is a three-dimensional toggle mechanism that includes a cylinder, an input disc that rotates about an axis in the cylinder, an output disc that reciprocates along an axial direction in the cylinder, and a link that connects the input disc and the output disc.

3 Claims, 4 Drawing Sheets

(51) Int. Cl.
*F16K 1/00* (2006.01)
*F16K 31/16* (2006.01)
*F04B 39/10* (2006.01)
*F16K 1/20* (2006.01)

(52) U.S. Cl.
CPC .............. *F16K 1/20* (2013.01); *F16K 31/047* (2013.01); *F16K 31/16* (2013.01)

(58) Field of Classification Search
USPC ....... 251/229, 279–280, 284, 129.11–129.13
See application file for complete search history.

(56) References Cited

U.S. PATENT DOCUMENTS

| | | | |
|---|---|---|---|
| 4,106,170 A | | 8/1978 | Schoeneweis |
| 4,133,215 A * | | 1/1979 | Norris ................... F16H 21/54 251/58 |
| 4,815,699 A * | | 3/1989 | Mueller ................. F16K 41/10 251/129.11 |
| 6,534,793 B1 * | | 3/2003 | Heritier-Best .......... F16K 31/04 251/129.11 |
| 7,086,636 B2 * | | 8/2006 | Telep ..................... F02M 26/69 123/568.24 |
| 8,272,650 B2 * | | 9/2012 | Freund .................. B60G 17/021 280/124.103 |
| 2005/0045839 A1 * | | 3/2005 | Kajitani ................. F16K 31/047 251/14 |
| 2009/0260514 A1 | | 10/2009 | Lezock et al. |
| 2011/0130208 A1 * | | 6/2011 | Freund .................. F16F 15/1205 464/24 |
| 2011/0190090 A1 * | | 8/2011 | Freund ..................... F16H 1/32 475/162 |
| 2013/0139503 A1 | | 6/2013 | Eggler et al. |

FOREIGN PATENT DOCUMENTS

| | | |
|---|---|---|
| GB | 1145845 A | 3/1969 |
| GB | 2044879 A | 10/1980 |
| JP | 47-022515 | 10/1972 |
| JP | 53-057372 | 5/1978 |
| JP | 58-196380 | 11/1983 |
| JP | 3526485 | 5/2004 |
| JP | 2006-29435 | 2/2006 |
| JP | 2010-023185 | 2/2010 |
| JP | 2010-507756 | 3/2010 |
| JP | 4469931 | 6/2010 |
| JP | 4581117 | 11/2010 |
| JP | 2010-275062 | 12/2010 |
| JP | 2013-530357 | 7/2013 |
| JP | 5600760 | 10/2014 |
| RU | 2002 118 511 A | 1/2004 |
| SU | 1155825 A | 5/1985 |
| SU | 1155825 A1 | 5/1985 |
| WO | WO 2004/044459 A1 | 5/2004 |

OTHER PUBLICATIONS

Written Opinion dated Jan. 24, 2017 in PCT/JP2016/082810 filed Nov. 4, 2016.
Decision to Grant dated Mar. 7, 2019 in corresponding Russian Patent Application No. 2018121352 (with English Translation), 10 pages.
Extended European Search Report dated Jun. 21, 2019 in Patent Application No. 16864130.6, 8 pages.

* cited by examiner

VALVE ACTUATOR FOR AN ELECTRICALLY ACTUATED POPPET VALVE INCLUDING A CONTINUOUSLY VARIABLE TRANSMISSION AND A POWER FREE LATCHING MECHANISM

CROSS REFERENCE TO RELATED APPLICATIONS

This application is a continuation application of International Application No. PCT/JP2016/082810, filed on Nov. 4, 2016 which claims priority to Japanese Patent Application No. 2015-223058, filed on Nov. 13, 2015 the entire contents of which are incorporated by reference herein.

BACKGROUND

1. Technical Field

Embodiments described herein relates to a valve actuator.

2. Description of the Related Art

Conventionally, a valve actuator that drives opening and closing of a so-called poppet valve has been generally known. Related techniques are illustrated in Japanese Patent No. 5600760 (PTL 1).

A valve actuator described in PTL 1 uses an electric motor as a drive source, and converts rotational movement made by the electric motor into linear movement by using a ball screw to operate a valve plug of a poppet valve at a constant speed with a constant force independently of the stroke.

SUMMARY

In the valve actuator described in PTL 1, an open/close speed of the poppet valve is decreased in some cases when the force to operate the valve plug is increased in order to obtain a shutting force needed to close the valve. On the other hand, when the open/close speed of the poppet valve is increased, the shutting force needed to close the valve cannot be obtained in some cases because the force to operate the valve plug is decreased.

In view of this, an object of the present disclosure is to provide a valve actuator that can achieve both an open/close speed needed to open and close a poppet valve and a shutting force needed to close the valve.

A valve actuator according to an aspect of the present disclosure is a valve actuator that drives opening and closing of a poppet valve and includes a motor and a transmission mechanism that transmits a drive force of the motor to the poppet valve. The transmission mechanism includes a booster mechanism, and the booster mechanism is a three-dimensional toggle mechanism that includes a cylinder, an input disc that rotates about an axis in the cylinder, an output disc that reciprocates along an axial direction in the cylinder, and a link that connects the input disc and the output disc.

The booster mechanism may include a ball joint, and the ball joint may be disposed in the cylinder to be in contact with an inner periphery of the cylinder, and interconnect an outer edge portion of the input disc and one end of the link as well as interconnect an outer edge portion of the output disc and the other end of the link.

The booster mechanism may include a load limiter that is provided between the output disc and a valve plug of the poppet valve, and that limits a load transmitted from the output disc to a valve seat via the valve plug.

The booster mechanism may include a stopper that is formed on the inner periphery of the cylinder and that restricts movement of the link, and the stopper may be disposed at an advanced position beyond a position where the link comes in parallel to the axis of the cylinder.

According to a valve actuator of the present disclosure, both an open/close speed needed to open and close a poppet valve and a shutting force needed to close the valve can be achieved.

DETAILED DESCRIPTION OF THE EMBODIMENTS

Details of an embodiment of the present disclosure are described below with reference to the drawings.

Figure 1:
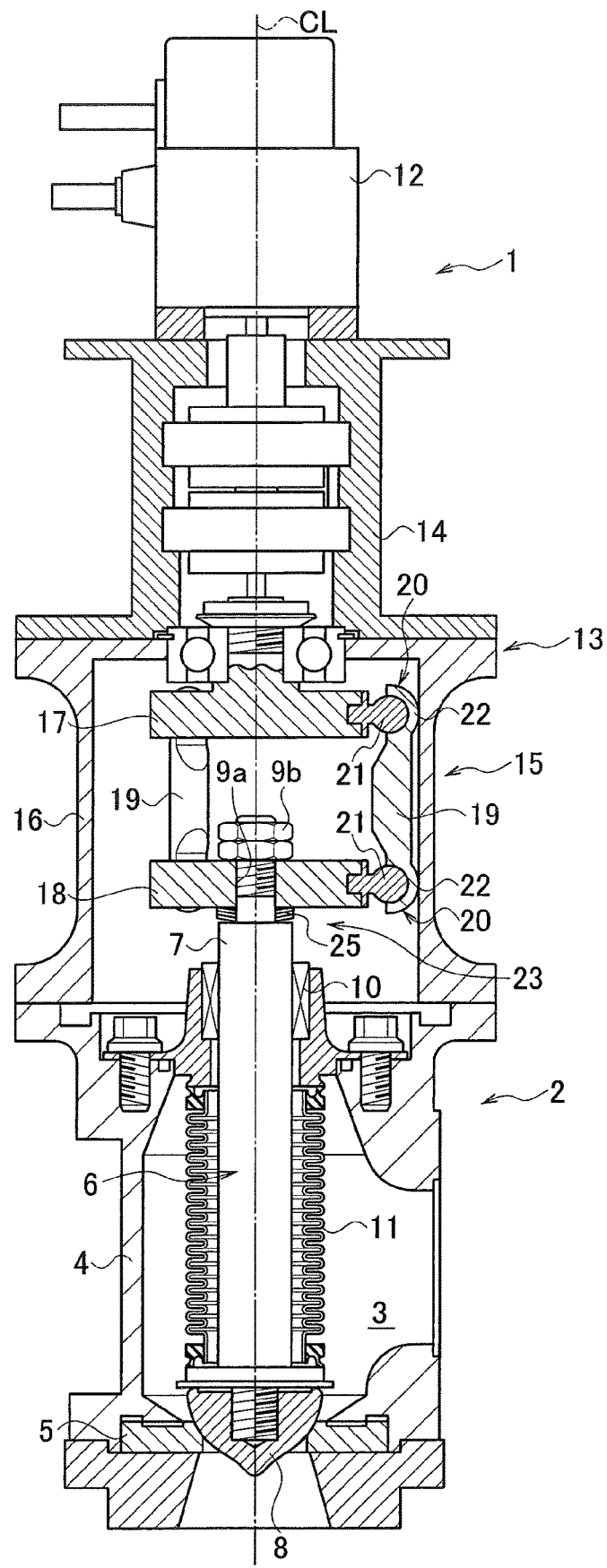
FIG. 1 is a cross-sectional view schematically illustrating a valve actuator according to an embodiment of the present disclosure.

A valve actuator 1 according to this embodiment is what drives opening and closing of a poppet valve 2 illustrated in FIG. 1. The poppet valve 2 is a valve of a type in which a valve plug moves in a direction at a right angle to a valve seat surface (HS). This poppet valve 2 is used, for example, to open and close a flow channel for supplying fuel to a rocket engine.

As illustrated in FIG. 1, the poppet valve 2 includes a valve housing 4 in which a fluid flow channel 3 is formed, and a valve seat 5 disposed in the middle of the flow channel 3. In the valve housing 4, a valve plug 6, which opens and closes the valve seat 5, is disposed. The valve plug 6 includes a valve stem 7 as a shaft portion of the valve plug 6, and a umbrella portion 8 attached on a tip end portion of the valve stem 7. Incidentally, in FIG. 1, a reference sign 9a denotes a hole portion provided in an output disc 18, to be described later, for coupling the valve plug 6, a reference sign 9b denotes a nut for coupling the valve plug 6, a reference sign 10 denotes an aligning mechanism of the valve plug 6, and a reference sign 11 denotes bellows.

The valve actuator 1 according to this embodiment includes a motor 12 and a transmission mechanism 13, which transmits a drive force of the motor 12 to the poppet valve 2.

The motor 12 is a stepping motor, for example. The motor 12 provided in the valve actuator 1 is operated by an electric signal transmitted from a power source driver (not illustrated) provided outside of the valve actuator 1 to the motor 12. Incidentally, the motor 12 is not limited to a stepping motor and may be a motor other than a stepping motor.

The transmission mechanism 13 includes a decelerator 14 and a booster mechanism 15.

The decelerator 14 is a planetary gear mechanism, for example. Rotation of the motor 12 is transmitted to the booster mechanism 15 after the number of rotations is reduced and torque is increased by the decelerator 14. Incidentally, the decelerator 14 is not limited to a planetary gear mechanism and may be a general gear transmission, a non-stage transmission, and a transmission of a type using a cam and the like.

The booster mechanism 15 is a three-dimensional toggle mechanism that includes a cylinder 16, an input disc 17, which rotates about an axis CL in the cylinder 16, the output disc 18, which reciprocates along an axis CL direction in the cylinder 16, and links 19, which connect the input disc 17 and the output disc 18. The input disc 17 is coupled with an output shaft of the decelerator 14, and the output disc 18 is coupled with the valve plug 6 of the poppet valve 2.

The input disc 17 is capable of rotating about the axis CL of the cylinder 16 while incapable of reciprocating in the axis CL direction. In contrast, the output disc 18 is incapable of rotating about the axis CL of the cylinder 16 while capable of reciprocating in the axis CL direction. In this embodiment, the input disc 17 and the output disc 18 are formed in circular shapes; however, they are not limited thereto. The input disc 17 and the output disc 18 may be formed in shapes other than the circular shapes.

Figure 2:
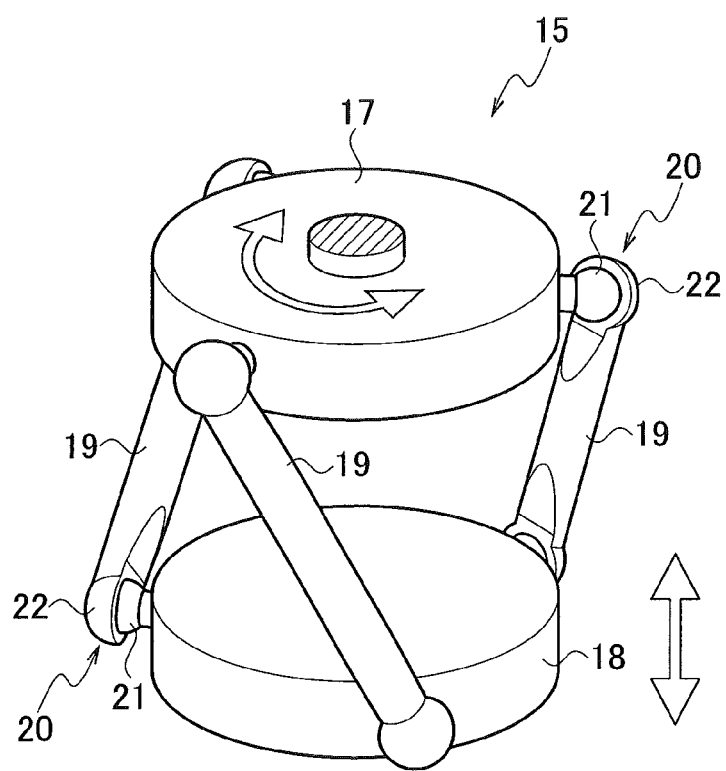
FIG. 2 is a perspective view schematically illustrating a three-dimensional toggle mechanism.

As illustrated in FIG. 2, the input disc 17 and the output disc 18 are connected with each other via the three links 19. Ball joints 20 interconnect an outer edge portion of the input disc 17 and ends on one side of the links 19 as well as an outer edge portion of the output disc 18 and ends on the other side of the links 19. The ball joint 20 includes a ball 21 provided on the outer edge portion of the input disc 17 and the outer edge portion of the output disc 18, and a hemisphere-shaped socket 22 provided at an end portion of the link 19. This ball joints 20 are disposed in the cylinder 16 to be in contact with an inner periphery of the cylinder 16.

The rotation of the motor 12 is converted from rotational movement to linear movement and the force thereof is increased and transmitted to the valve plug 6 of the poppet valve 2 by the booster mechanism 15. Specifically, the rotation of the motor 12 transmitted from the decelerator 14 to the input disc 17 is outputted by the output disc 18 as reciprocating movement along the axis CL direction of the cylinder 16.

Figure 4:
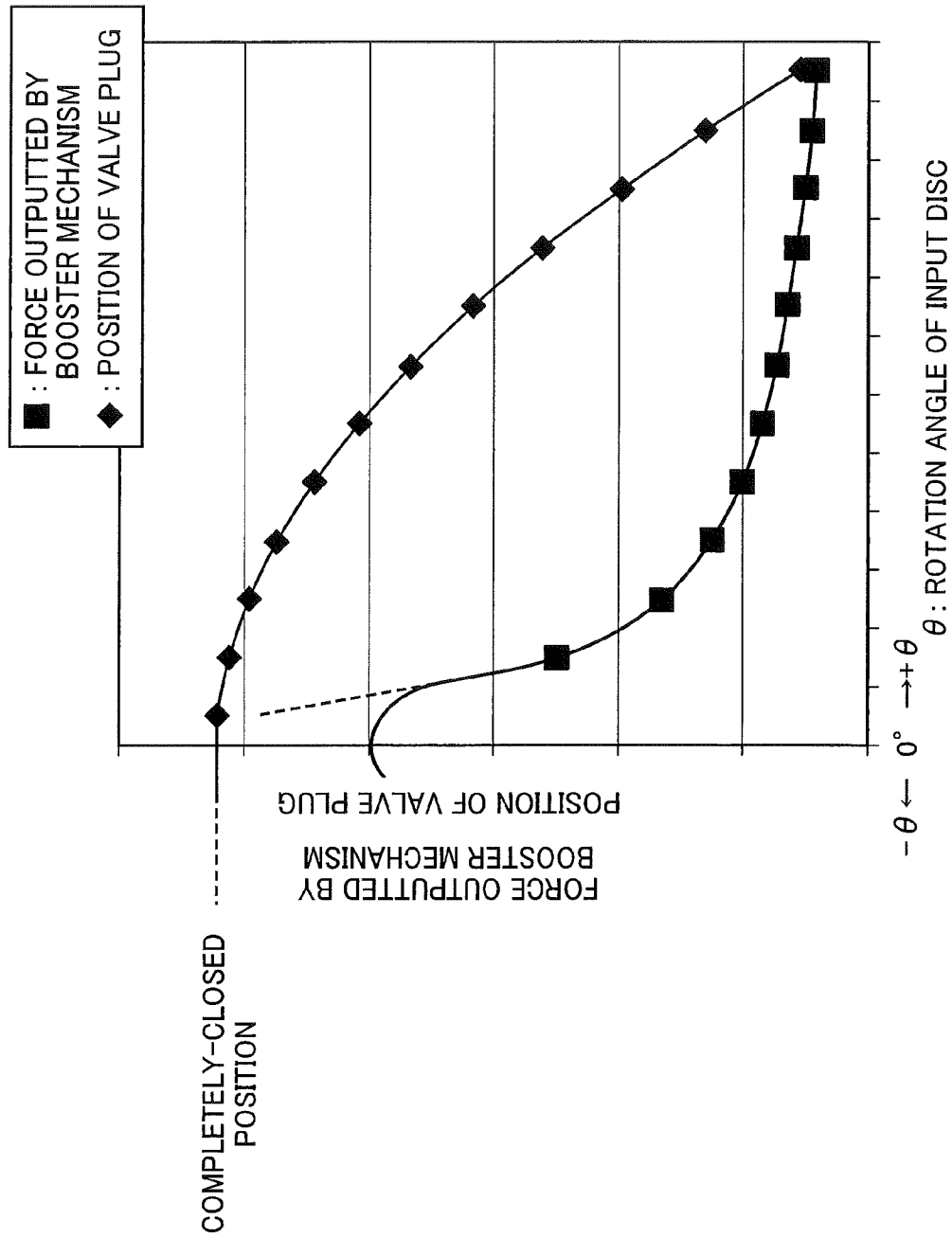
FIG. 4 is a graph illustrating a relation between a force outputted by a booster mechanism and a position of a valve plug.

FIG. 4 is a graph illustrating a relation between the force outputted by the booster mechanism 15 and the position of the valve plug 6. Incidentally, in FIG. 4, the horizontal axis represents rotation angles of the input disc 17, and a rotation angle of the input disc 17 when the links 19 are parallel to the axis CL of the cylinder 16 is set to "0°." In the meantime, the vertical axis represents forces outputted by the booster mechanism 15 and positions of the valve plug 6 and shows that the valve plug 6 comes closer to the valve seat 5 as the line rises from the lower side to the upper side of the graph.

The rotation of the motor 12 is transmitted from the input disc 17 to the output disc 18 via the links 19. As seen from FIG. 4, when the valve plug 6 is at a position close to a completely-closed position (the left side part of FIG. 4), the open/close speed of the valve plug 6 is slow, but the force outputted by the booster mechanism 15 (a force to press the valve plug 6 against the valve seat 5) is large. In contrast, when the valve plug 6 is at a position far from the completely-closed position (the right side part of FIG. 4), the force outputted by the booster mechanism 15 is small, but the open/close speed of the valve plug 6 is fast.

Figure 3A:
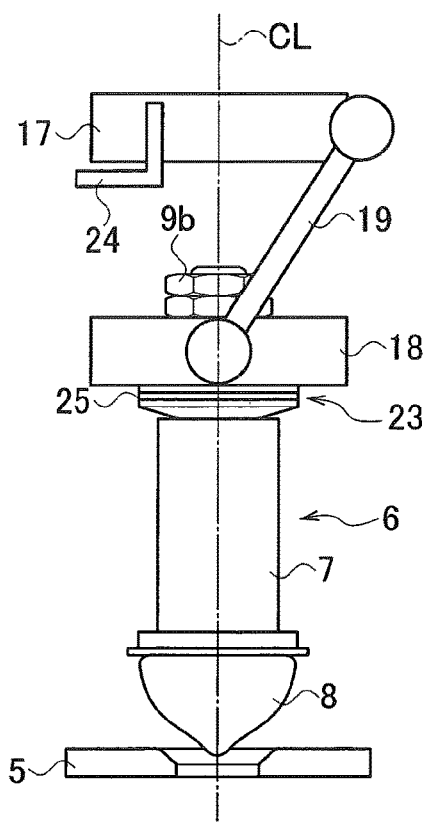
FIG. 3A is an explanatory diagram schematically illustrating a stopper.
Figure 3B:
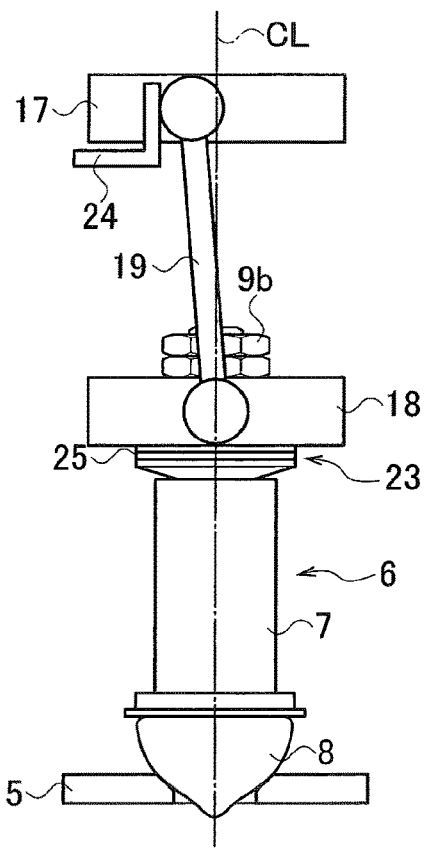
FIG. 3B is an explanatory diagram schematically illustrating the stopper.

As illustrated in FIG. 3A and FIG. 3B, the booster mechanism 15 further includes a load limiter 23 and a stopper (a mechanical stopper) 24.

The load limiter 23 is provided between the output disc 18 and the valve plug 6 of the poppet valve 2, and limits the load transmitted from the output disc 18 to the valve seat 5 via the valve plug 6. In this embodiment, a disc spring 25 is interposed between the output disc 18 of the booster mechanism 15 and the valve plug 6 of the poppet valve 2. This allows the disc spring 25 to exert a function as the load limiter 23 that prevents a predetermined amount or more of a load from being transmitted from the output disc 18 to the valve seat 5 via the valve plug 6 (see FIG. 4). In contrast, when no disc spring 25 is provided between the output disc 18 and the valve plug 6, there is a possibility of excessive increase of the force outputted by the booster mechanism 15 as illustrated with a dashed line in FIG. 4 when the valve plug 6 is near the completely-closed position. Incidentally, a characteristic of the load limiter 23 can be changed by changing the number and the combination of the disc springs 25 (parallel, straight, or parallel-straight).

The stopper 24 is formed on the inner periphery of the cylinder 16 and restricts the movement of the link 19. In this embodiment, as illustrated in FIG. 3A and FIG. 3B, the stopper 24 is provided at an advanced position which the link 19 reaches when moved a bit more beyond a position where the link 19 comes in parallel to the axis CL of the cylinder 16, and the stopper 24 only allows the link 19 to move up to the position of the stopper 24. This allows the disc spring 25 and the stopper 24 to exert a function as a latching mechanism that enables the valve plug 6 to stay at the completely-closed position even when the power for the motor 12 turns off. In other words, since it is needed to apply a force determined by the disc spring 25 to the valve plug 6 to make the valve plug 6 back to the open direction from the state illustrated in FIG. 3B, the valve plug 6 will not move back to the open direction unless such a force is applied thereto.

Operations and effects of this embodiment are described below.

(1) The valve actuator 1 according to this embodiment is the valve actuator 1 that drives opening and closing of the poppet valve 2 and includes the motor 12 and the transmission mechanism 13, which transmits a drive force of the motor 12 to the poppet valve 2. The transmission mechanism 13 includes the booster mechanism 15. The booster mechanism 15 is the three-dimensional toggle mechanism that includes the cylinder 16, the input disc 17, which rotates about the axis CL in the cylinder 16, the output disc 18, which reciprocates along the axis CL direction in the cylinder 16, and the links 19, which connect the input disc 17 and the output disc 18.

In the valve actuator 1 according to this embodiment, the three-dimensional toggle mechanism is used in order to convert the rotational movement of the motor 12 to the linear movement. This makes it possible to obtain both the shutting force needed to close the valve when the valve plug 6 of the poppet valve 2 is at the completely-closed position and abuts the valve seat 5, and the open/close speed needed to open and close the poppet valve 2. In other words, the rotation of the motor 12 is transmitted from the input disc 17 to the output disc 18 via the links 19, and thus the force outputted by the booster mechanism 15 is increased when the valve plug 6 is near the completely-closed position although the open/close speed of the valve plug 6 is slow. In contrast, when the valve plug 6 is far from the completely-closed position, the open/close speed of the valve plug 6 is increased although the force outputted by the booster mechanism 15 is small. Hence, both the open/close speed needed to open and close the poppet valve 2 and the shutting force needed to close the valve can be achieved.

(2) In the valve actuator 1 according to this embodiment, the booster mechanism 15 includes the ball joints 20. These ball joints 20 interconnect the outer edge portion of the input disc 17 and ends on one side of the links 19 as well as interconnect the outer edge portion of the output disc 18 and ends on the other side of the links 19. The ball joints 20 are disposed in the cylinder 16 to be in contact with the inner periphery of the cylinder 16.

This allows the ball joints 20 to move in the cylinder 16 by using the inner periphery of the cylinder 16 as a guide, and the assembly of the ball joints 20 is thus maintained. Consequently, it is possible to easily assemble the structure of the ball joints 20 without using a screw and the like, thereby reducing the number of parts.

(3) In the valve actuator 1 according to this embodiment, the booster mechanism 15 includes the disc spring 25 (the load limiter 23) that is provided between the output disc 18 and the valve plug 6 of the poppet valve 2, and that limits the load transmitted from the output disc 18 to the valve seat 5 via the valve plug 6.

Since the booster mechanism 15 includes the disc spring 25 (the load limiter 23), a predetermined amount or more of a load is prevented from being transmitted from the output disc 18 to the valve seat 5 via the valve plug 6. This makes it possible to reliably suppress breakage of the valve seat 5.

(4) In the valve actuator 1 according to this embodiment, the booster mechanism 15 includes the stopper 24 which is formed on the inner periphery of the cylinder 16, and which restricts movement of the link 19. The stopper 24 is disposed at an advanced position beyond the position where the link 19 comes in parallel to the axis CL of the cylinder 16.

Since the booster mechanism 15 includes the stopper 24, the valve plug 6 coupled with the output disc 18 can reliably stop at a predetermined position (for example, the completely-closed position). In addition, since the stopper 24 is disposed at the advanced position beyond the position where the link 19 comes in parallel to the axis CL of the cylinder 16, the stopper 24 can exert a function as a latching mechanism.

Meanwhile, although the valve actuator of the present disclosure is described with the above-described embodiment as an example, it is not limited thereto. Various other embodiments can be employed without departing from the scope of the present disclosure.

For example, the connecting portions between the input disc and the links as well as the connecting portions between the output disc and the links are not limited to the ball joints, and universal joints may also be used. In addition, the number of the links that connect the input disc and the output disc is not limited to three, but the number can be selected arbitrarily.

What is claimed is:

1. A valve actuator that drives opening and closing of a poppet valve, comprising:
    a motor; and
    a transmission mechanism that transmits a drive force of the motor to the poppet valve, wherein
    the transmission mechanism includes a booster mechanism, and
    the booster mechanism is a three-dimensional toggle mechanism that includes a cylinder, an input disc that rotates about an axis in the cylinder, an output disc that reciprocates along an axial direction in the cylinder, a link that connects the input disc and the output disc, and a ball joint,
    the ball joint is disposed in the cylinder to be in contact with an inner periphery of the cylinder, and interconnects an outer circular edge portion of the input disc and one end of the link as well as interconnects an outer circular edge portion of the output disc and the other end of the link.

2. The valve actuator according to claim 1, wherein
    the booster mechanism includes a load limiter that is provided between the output disc and a valve plug of the poppet valve, and that limits a load transmitted from the output disc to a valve seat via the valve plug.

3. The valve actuator according to claim 1, wherein
    the booster mechanism includes a stopper that is formed on the inner periphery of the cylinder and that restricts movement of the link, and
    the stopper is disposed at an advanced position beyond a position where the link comes in parallel to the axis of the cylinder.

* * * * *